United States Patent [19]

Marfilius et al.

[11] Patent Number: 5,150,946
[45] Date of Patent: Sep. 29, 1992

[54] AUTOMOTIVE ARMREST WITH CUPHOLDER

[75] Inventors: Donald F. Marfilius, Farmington Hills; Steven A. Schulte, Northville, both of Mich.

[73] Assignee: Lear Seating Corporation, Southfield, Mich.

[21] Appl. No.: 592,642

[22] Filed: Oct. 3, 1990

Related U.S. Application Data

[63] Continuation-in-part of Ser. No. 482,184, Feb. 20, 1990, abandoned.

[51] Int. Cl.⁵ .............................................. A47C 7/62
[52] U.S. Cl. .................................... 297/194; 297/417
[58] Field of Search ............... 297/194, 417, 411, 188, 297/191; 108/25, 26

[56] References Cited

U.S. PATENT DOCUMENTS

| | | | |
|---|---|---|---|
| 3,136,578 | 6/1964 | Tihovici | 297/194 |
| 3,690,724 | 9/1972 | Douglas et al. | 297/194 |
| 4,191,420 | 3/1980 | Fassett et al. | 297/194 |
| 4,521,056 | 6/1985 | Lindenmuth | 297/194 X |
| 4,533,175 | 8/1985 | Brennan | 297/417 X |
| 4,719,704 | 1/1988 | Cook | 297/194 X |
| 4,779,923 | 10/1988 | Lang et al. | 297/194 |
| 4,818,017 | 4/1989 | Dykstra et al. | 297/194 |
| 5,004,296 | 4/1991 | Ziegenfuss, Jr. | 297/194 |
| 5,037,157 | 8/1991 | Wain et al. | 297/194 |

FOREIGN PATENT DOCUMENTS 3143957 5/1983 Fed. Rep. of Germany ...... 297/194

Primary Examiner—Jose V. Chen
Attorney, Agent, or Firm—Reising, Ethington, Barnard, Perry & Milton

[57] ABSTRACT

An armrest assembly (10, 110, 210) is provided for pivotal attachment to an automotive seat (16). The armrest assembly (10, 110, 210) includes a cellular foam armrest pad (26, 126, 226) and an armrest cover (28, 128, 228) disposed about the armrest pad (26, 126, 226). The assembly (10, 110, 210) further includes a receptacle (46, 146, 246) for receiving and supporting a beverage container (C) and which is formed of a pliable, vacuum formable vinyl material to maintain the "soft touch" characteristic of the armrest assembly (10, 110, 210). A method is also provided for making the armrest assembly (10, 110, 210).

7 Claims, 5 Drawing Sheets

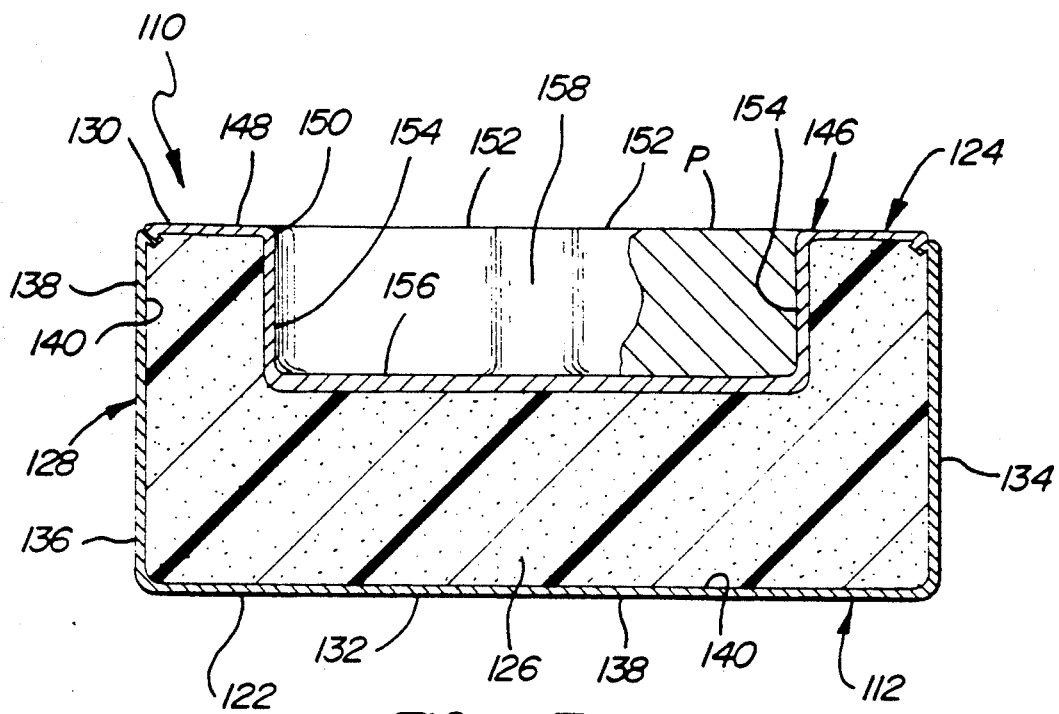

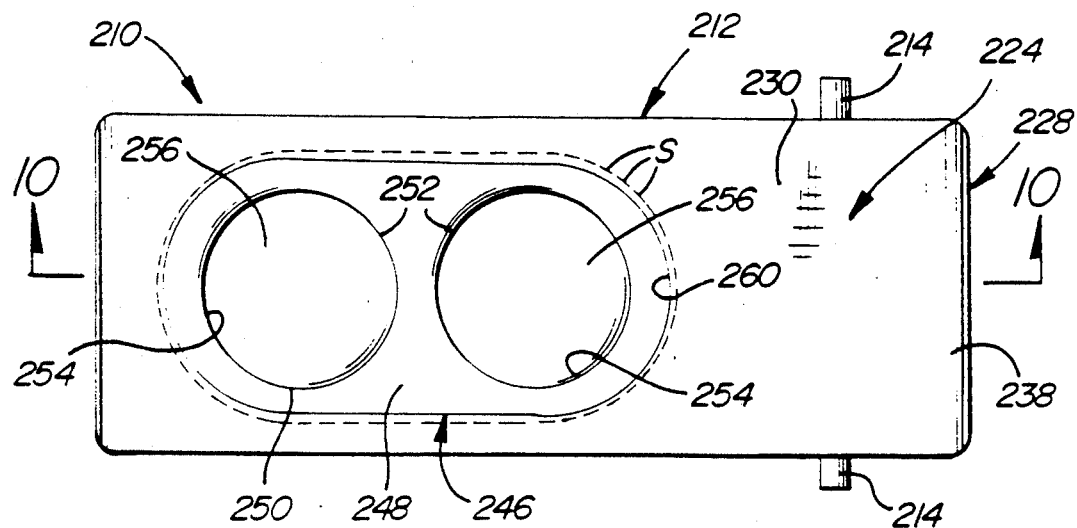
FIG-9
FIG-10
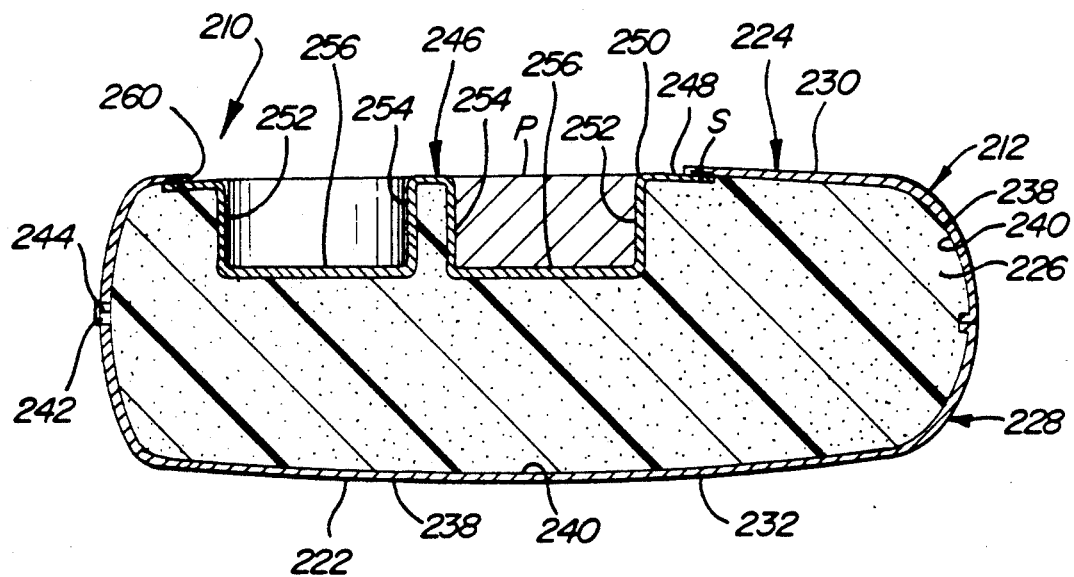

AUTOMOTIVE ARMREST WITH CUPHOLDER

This is a continuation-in-part of copending application Ser. No. 482,184 filed on Feb. 20, 1990 now abandoned.

TECHNICAL FIELD

The subject invention relates to armrests of the type for use in automotive seating applications, and more particularly to armrests having a receptacle therein for receiving and supporting a beverage container.

BACKGROUND ART

In today's competitive automotive world, much effort is expended in designing an automobile's interior to provide features which will optimize the passenger's comfort and convenience. For instance, today's automobiles are typically equipped with armrests located next to the passengers for supporting their arms to decrease passenger fatigue and increase their riding pleasure. Another convenience to which today's passengers have become accustomed to is a beverage container holder for supporting a beverage container or cup while riding in the automobile. Typical of such a beverage container holder is the glove compartment door type in which cylindrical recesses are formed on the inside of the glove compartment door so that when the door is opened it functions as a tray. In addition to being unsteady, this type of beverage container holder is not accessible to every passenger, especially the driver of the automobile. This situation presents a potential safety hazard since a driver must divert his attention away from driving in order to reach his beverage.

Several attempts have been made to combine the comfort features of an armrest and the convenience features of a beverage container holder into a single unit. These devices generally fall into one of two categories. The first type includes armrests having a complex, costly and sometimes unreliable cup holder mechanism which is moveable into and out of a storage compartment formed within the armrest assembly between a storage position and use position, respectively. Typical of such devices are those shown in U.S. Pat. No. 4,733,908 to Dykstra et al, issued Mar. 29, 1988.

The second type includes a rigid receptacle disposed in the upper surface of the armrest into which a beverage container is received and supported. Although these types of beverage container holders have the inherent advantage of simple construction, low cost and reliability over the first type, the holders available thus far have proven to be unsatisfactory since the comfort provided by the armrest is greatly sacrificed by incorporating a rigid receptacle in the upper surface of the armrest. Another example of an armrest including a rigid cupholder is disclosed in U.S. Pat. No. 3,233,940 to Tooley, issued Feb. 8, 1966.

Thus, there is a need in the automotive market for an armrest assembly including a beverage container holder which is simply constructed, inexpensive to produce and is reliable and which will not significantly interfere with the comfort and convenience of the armrest.

SUMMARY OF THE INVENTION AND ADVANTAGES

The subject invention provides an armrest assembly for use in an automotive vehicle comprising a fabric covered cellular foam cushion pad presenting an upper arm resting surface. The assembly includes receptacle means disposed in the upper arm resting surface of the cushion pad for receiving and supporting a beverage container and is characterized by the receptacle means being pliable.

A method is also provided for making the armrest assembly of the subject invention and includes the steps of forming an armrest cover having a decorative front side and an opposite back side, securing a pliable receptacle having a flange and a recess extending outwardly of the back side of the armrest cover and introducing a supportive cellular foam armrest pad into the armrest cover and about the recess to form a supportive fabric covered cellular foam cushion pad.

An advantage of utilizing a receptacle which is pliable is that it has an inherent "soft touch" feeling similar to the armrest so that the comfort which has come to be expected from the armrest is not sacrificed by the addition of the pliable receptacle.

Another advantage of using a pliable receptacle is that the receptacle can absorb any vibration between the container and the receptacle unlike the conventional hard plastic beverage container holders.

Yet another significant advantage of the instant invention is that a manufacturer can supply an armrest including the subject receptacle for a fraction of the cost of providing an armrest with conventional beverage container holders. Thus, cost does not prohibit the subject invention from being provided in smaller, less expensive vehicles.

FIGURES OF THE DRAWINGS

Other advantages of the present invention will be readily appreciated as the same becomes better understood by reference to the following detailed description when considered in connection with the accompanying drawings wherein:

FIG. 7 is a cross-sectional view taken substantially along lines 7—7 of FIG. 7;

FIG. 8 is a perspective view of a third embodiment of the subject invention;

FIG. 9 is a top view of the embodiment of FIG. 8; and

FIG. 10 is a cross-sectional view taken substantially along lines 10—10 of FIG. 9.

DETAILED DESCRIPTION OF THE DRAWINGS

One of three embodiments of an armrest assembly constructed in accordance with the present invention is generally indicated at 10 in FIGS. 1-4. All three embodiments are designed and adapted for use with automotive seats.

Figure 4:
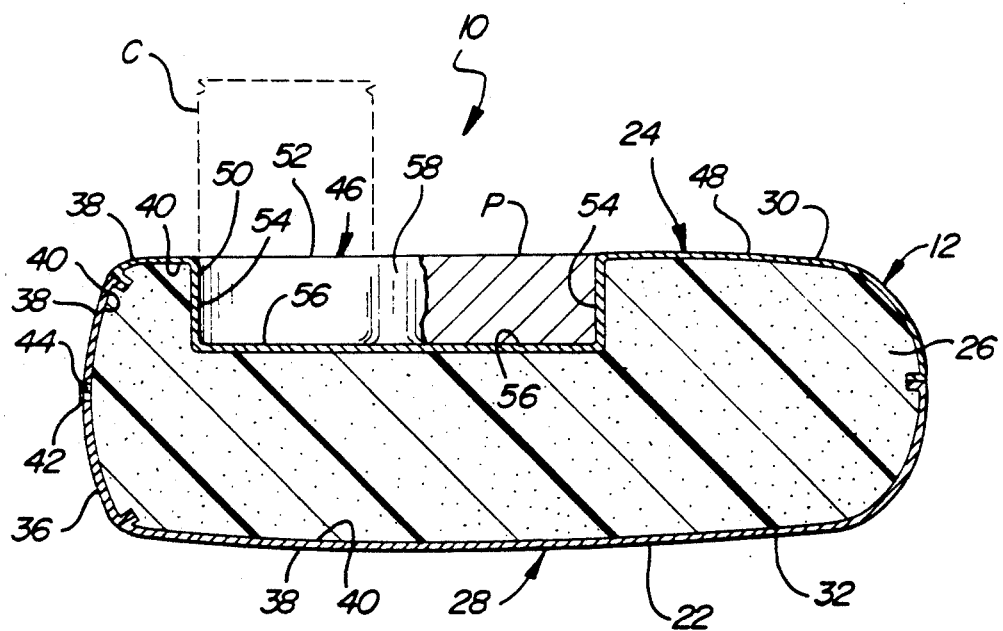
FIG. 4 is a cross-sectional view of the subject invention taken substantially along lines 4—4 of FIG. 3.

The assembly 10 of FIG. 4 comprises a fabric covered cellular foam cushion pad 12 having pivot means 14 for pivotally securing the cushion pad 12 to an automotive seat 16. The seat 16 is shown for illustrative purposes to be a front bench-type automotive seat having a cavity or hollow 18 formed in the backrest portion 20 of the seat 16 for receiving the cushion pad 12. However, the armrest assembly 10 is equally suited for other seats of an automobile as well.

Figure 1:
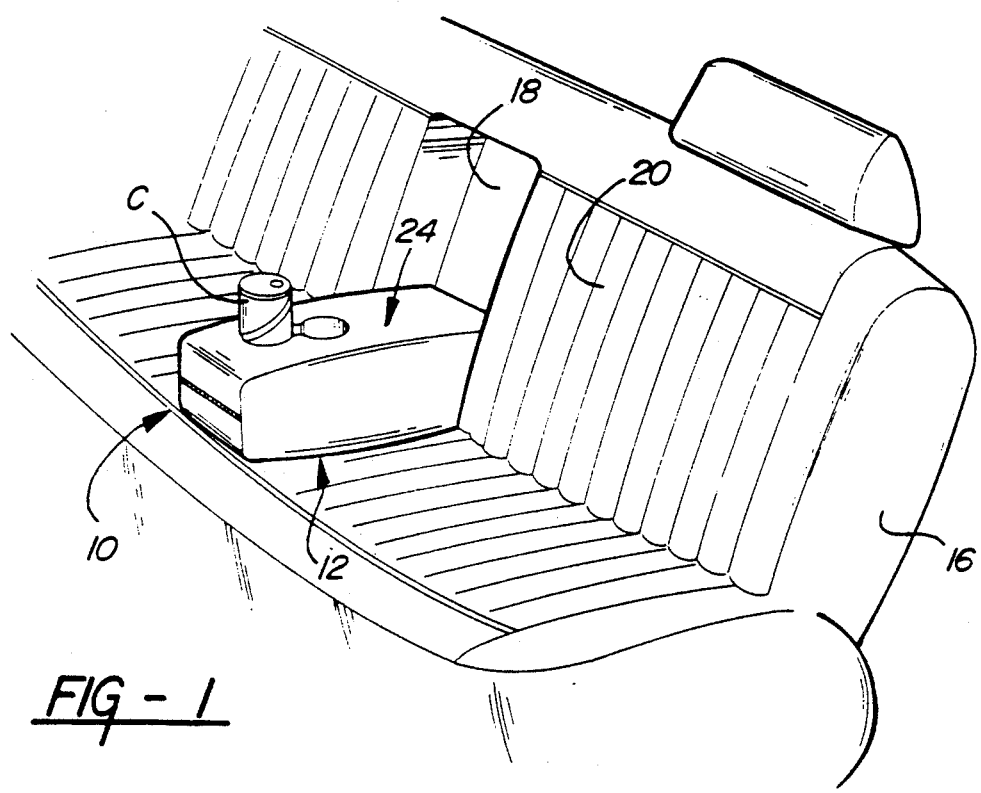
FIG. 1 is a perspective view of a preferred embodiment of the subject invention shown attached to an automotive seat.
Figure 2:
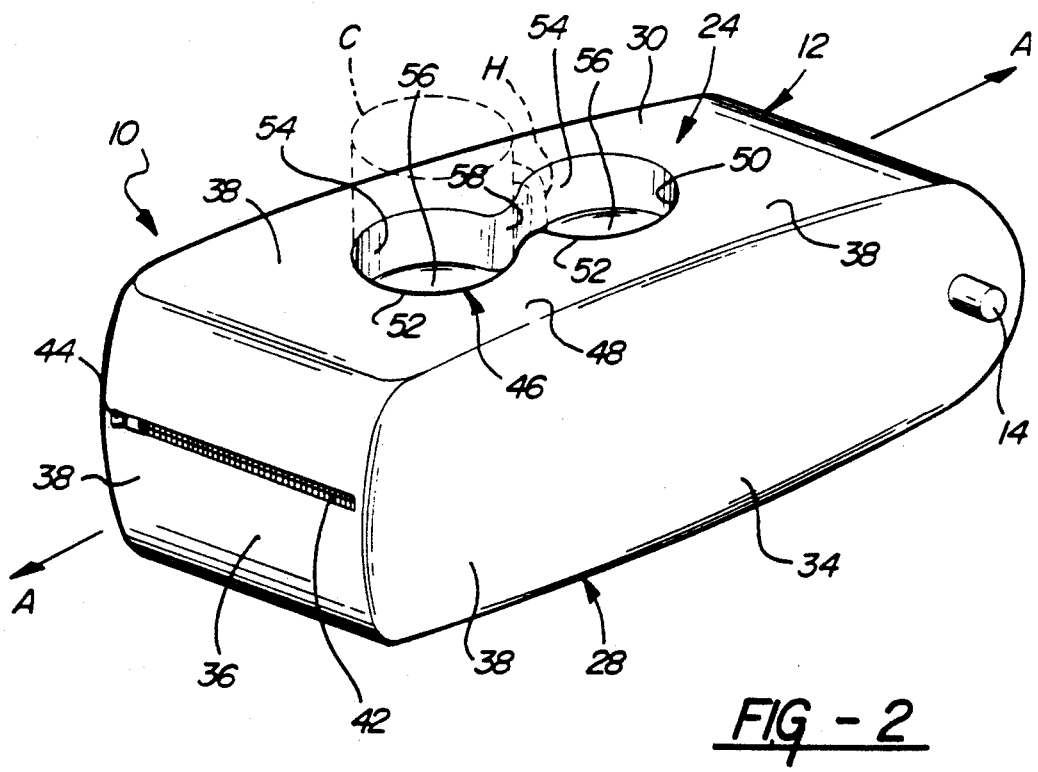
FIG. 2 is a detailed perspective view of the subject invention as shown in FIG. 1.

The pivot means 14 includes bolts or pins 14 connecting the cushion pad 12 to the seat 16 for pivotal movement of the cushion pad 12 between the armresting position as shown in FIG. 1 and a storage position with the cushion pad 12 received in the hollow 18 of the seat 16. In the storage position, the underside 22 of the armrest assembly 10 is flush with the backrest 20 of the seat 16 to accommodate an additional passenger or to store the armrest assembly 10 completely out of the way when not in use.

The cushion pad 12 presents an upper armresting surface 24 for supporting the arm of a passenger when the assembly 10 is in the armresting position.

The cushion pad 12 is comprised of an elongated rectangular shaped cellular foam armrest pad 26 extending along a central axis A thereof and an armrest cover 28 disposed about the armrest pad 26. The armrest pad 26 may be of the pre-formed foam rubber type or may be formed using a foam-in-place technique as will be explained hereafter.

The armrest cover 28 may be constructed from any of a number of different fabric materials commonly used in the automotive seating industry such as woven fabrics, vinyl or the like.

The armrest cover 28 is constructed by sewing a plurality of individual panels together to form a bag-like structure for receiving the armrest pad 26. The armrest cover 28 includes a top panel 30, a bottom panel 32 and two side panels 34, 36. Depending upon the specific application, the armrest cover 28 may also include a front panel 36 as shown in FIGS. 1-4. Alternatively, the top 30 and bottom 32 panels may be joined at their ends instead of providing a separate front panel 36. Each of the panels includes a finished decorative front side 38 and an opposite unfinished back side 40.

The armrest cover 28 further includes an access opening 42 through which the armrest pad 26 is received into the armrest cover 28. As shown best in FIG. 2, the access opening 42 is disposed in the front panel 36 and includes a zipper 44 for closing the armrest cover 28 once the armrest pad 26 is disposed within the armrest cover 28. As will be appreciated, however, the access opening 42 could also be located in the rear portion of the armrest cover 28 where the top 30 and bottom 32 panels meet.

The assembly 10 of the present invention includes receptacle means 46 disposed in the upper armresting surface 24 of the cushion pad 12 for receiving and supporting the beverage container C. The receptacle means 46 comprises a one-piece member having a flange 48 forming at least a portion of the upper armrest surface 24 and an integral recess 50 extending beyond the upper armresting surface 24 into the cushion pad 12 for supporting the beverage container C. As can be seen by examining FIGS. 1-4, the receptacle means 46 of the first embodiment comprises the entire top panel 30 of the armrest cover 28.

The receptacle means 46 of the present invention is pliable. That is, the receptacle means 46 is constructed of a flexible, supple, readily yielding material that is easily bent or folded and which returns to its original shape after being deformed. Thus, the receptacle means 46 of the present invention exhibits the same "soft touch" comfort characteristics as the cushion pad 12, unlike the rigid, hard plastic receptacle inserts that have thus been used in the industry. As will be explained more fully later, the pliability of the receptacle means 46 of the present invention allows the armrest cover 28 to be inverted from back side out to front side out once the panels of the armrest cover 28 are sewn together. If the receptacle means 46 was rigid, like the prior art, this would not be possible.

The recess 50 of the receptacle means 46 comprises two cylindrical shaped wells 52, each dimensioned to receive and support a beverage container C. Each of the wells 52 has a supportive side wall 54 and a supportive bottom wall 56 integrally connected to the flange 48 of the receptacle means 46.

The receptacle means 46 is preferably formed by heating a sheet of vacuum formable vinyl to a specified forming temperature and urging the sheet against a contoured mold (not shown) under the influence of a vacuum. The mold may be of a female contour type wherein the sheet is drawn into a cup-like recess to form the recess 50 of the receptacle means 46 or, alternatively, the mold may be a male contoured mold surface having pegs or studs protruding therefrom against which the vinyl sheet is drawn to form the recess 50. With the male contoured mold, the receptacle means 46 may be formed with a thicker bottom wall 56 to add greater strength to the wells 52.

The recess 50 of the first embodiment further includes a connecting portion 58 interconnecting respective side walls 54 and bottom walls 56 of the wells 52. The connecting portion 58 is dimensioned to accommodate a handle H of a beverage container C (such as a handle of a coffee cup) received in either of the wells 52.

Figure 3:
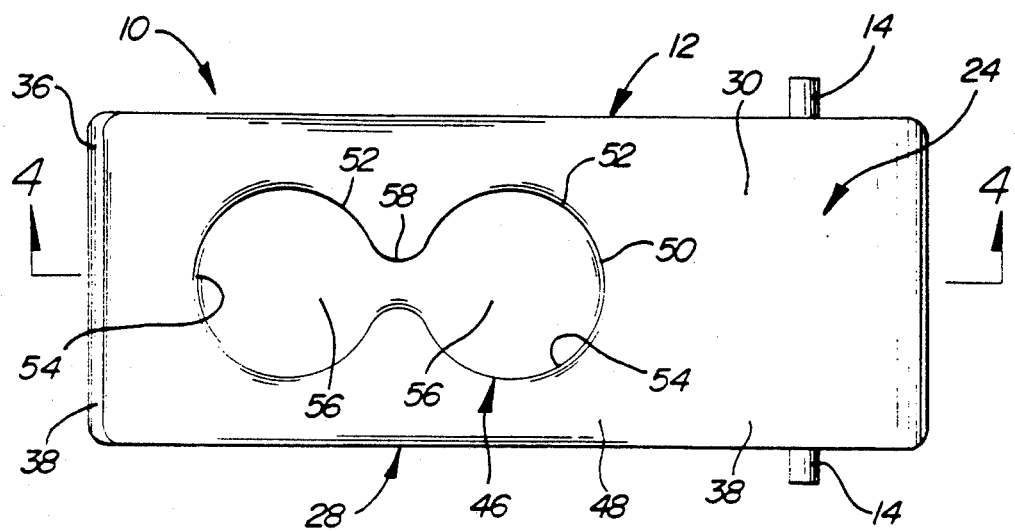
FIG. 3 is a top view of the subject invention.

The recess 50 of the first embodiment lies along the central axis A of the assembly 10 and has the appearance of a dumb-bell or figure eight when viewed in plan as in FIG. 3. Also, the receptacle means 46 is radiused or rounded where the flange 48 meets the side walls 54 and where the side walls 54 meet the bottom walls 56 for comfort and easy cleanup.

Figure 5:
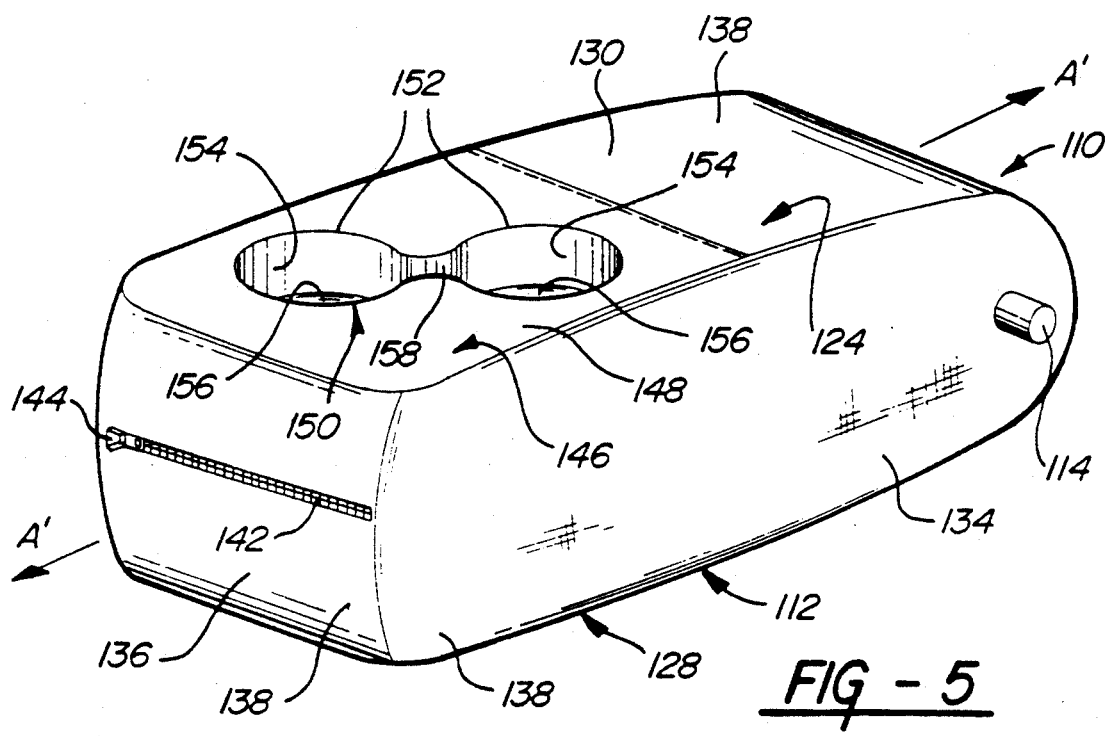
FIG. 5 is a perspective view of a second embodiment of the subject invention.
Figure 6:
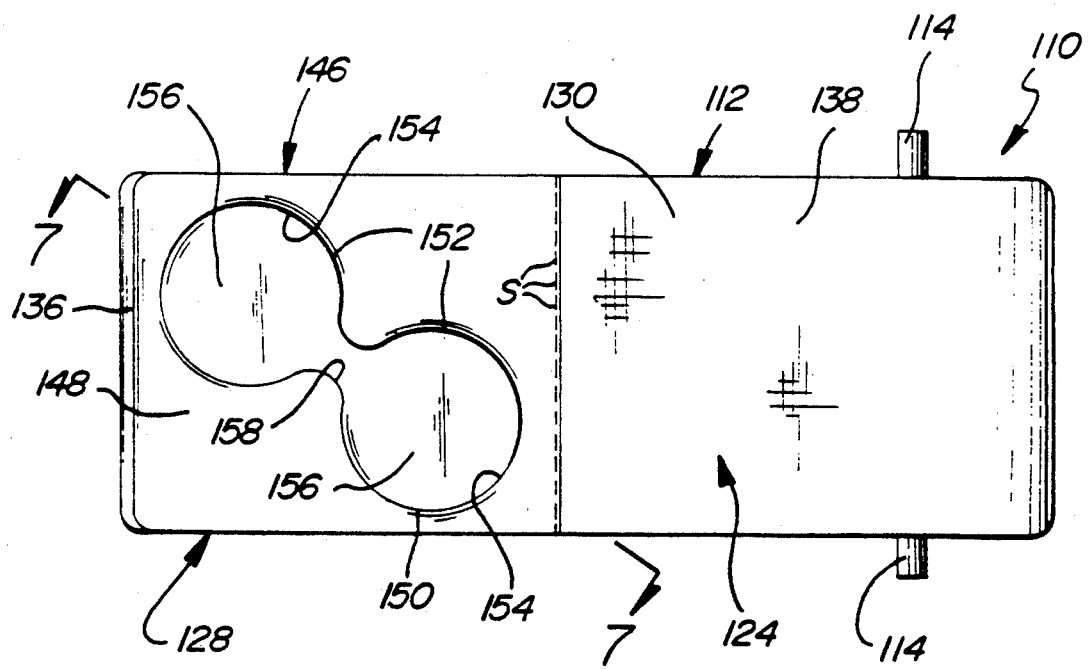
FIG. 6 is a top view of the embodiment of FIG. 5.

The second embodiment of the subject invention is generally shown at 110 in FIGS. 5-7. The assembly 110 of the second embodiment is similar in all respects to the assembly 10 of the first embodiment except the receptacle means 146 does not embody the entire top panel 130 of the armrest cover 128, but rather comprises only the frontal portion of the top panel 130. The remaining portion of the top panel 130 is fabricated from the same material as the other panels.

Additionally, the recess 150 of the second embodiment is offset from the central axis A' of the assembly 110 approximately 45°. It will be appreciated, however, that the recess 150 may be offset by other than 45° depending upon the specific requirements of a particular application.

A third embodiment of an armrest assembly made in accordance with the subject invention is generally shown at 210 in FIGS. 8-10.

The armrest assembly 210 of the third embodiment is similar to the armrest assemblies of the first two embodiments except that the receptacle means 246 of the third embodiment has no connecting portion between the wells 252 and embodies a smaller portion of the top panel 230 of the armrest panel 228. The recess 250 lies along the central axis A" of the assembly 210.

To accommodate the receptacle means 246, a portion of the top panel 230 is cut out to form a hole or opening 260 in the upper armresting surface 224 of the cushion pad 112. The opening 260 is preferably dimensioned smaller than the perimeter of the flange 248 but large enough so that the recess 250 is not overlapped by the armrest cover 228. In other words, the periphery of the opening 260 lies intermediate between the perimeter of the flange 248 and the recess 250.

The flange 248 of the receptacle means 246 is fixedly secured to the top panel 230 of the armrest cover 228 by a plurality of sewn stitches S in such a manner that the armrest cover 228 overlaps the flange 248 as described above and a portion of the flange 248 is disposed between the armrest cover 228 and the armrest pad 226 as best illustrated in FIG. 10.

With any of the three embodiments, the armrest pad 26, 126, 226 may be prefabricated from foam rubber having contours which compliment the armrest cover 28, 128, 228 and the recess 50, 150, 250. Alternatively, the armrest pad 26, 126, 226 may be formed using a foam-in-place technique which is well known in the art. With this technique, a curable liquid foam is injected into the armrest cover 28, 128, 228 and conforms to the contours of the armrest cover 28, 128, 228 and recess 50, 150, 250, after which it cures to form a supportive foam armrest pad 26, 126, 226.

METHOD FOR MAKING THE INVENTION

A method is also provided for making an automobile armrest assembly in accordance with the present invention. With specific reference to the first embodiment, the method includes the steps of forming an armrest cover 28 having a finished decorative front side 38 and an opposite back side 40 and securing a pliable receptacle 46 having a flange 48 and a recess 50 extending outwardly of the wrong side 40 of the armrest cover 28 to the armrest cover 28 and introducing a supportive cellular foam armrest pad 26 into the armrest cover 28 and about the recess 50 to form a supportive fabric covered cellular foam cushion pad 12.

More specifically, the armrest cover 28 is formed by sewing individual top 30, bottom 32, side 34 and front 36 panels together to form a bag-like structure for receiving the armrest pad 26. In the preferred method, the panels 30, 32, 34 and 36 are sewn together with the back side 40 of the panels facing outwardly of the armrest cover 28 and the front side 38 of the panels turned inside of the armrest cover 28. That is, the armrest cover 28 is initially sewn inside out with the seems of the panels exposed.

With the first embodiment, the receptacle 46 embodies the entire top panel so that when the armrest panel 28 is initially sewn together back side out, the recess 50 of the receptacle 46 projects outwardly of the armrest cover 28.

Once the armrest cover 28 is sewn together back side out, the cover 28 is then inverted by drawing the armrest cover 28 through the access opening 42 thereof so that the front side 38 of the panels 30, 32, 34 and 36 face outwardly and the back side 40 of the panels are on the interior of the armrest cover 28.

The receptacle 46 is vacuum formed from a soft, pliable and flexible material, as described in the previous section, which allows the receptacle 46 to be attached to the armrest cover 28 in the initial stages of fabrication (i.e., when being sewn back side out) since the pliable receptacle 46 flexes to accommodate inversion of the armrest cover 28.

Once the armrest cover 28 is inverted with the decorative front side 38 facing outwardly, the cellular foam armrest pad 26 is introduced into the armrest cover 28. This may be accomplished by either slipping the armrest cover 28 over a preformed, contoured armrest pad 26 or, alternatively, injecting curable liquid foam into the armrest cover 28 and about the recess 50 of the receptacle 46 using the foam-in-place technique described above. In either method, an armrest pad 26 is provided having contours which conform to the shape of the armrest cover 28 and the recess 50 of the receptacle 46.

When using the foam-in-place injection method for forming the armrest pad 26, a plug P having the same shape as the recess 50 is inserted into the recess 50 of the receptacle 46 prior to injecting the liquid foam into the armrest cover 28. The plug P maintains the shape of the recess 50 during injection of the liquid foam which otherwise would tend to force the soft, yieldable recess 50 outwardly of the armrest cover 28. Once the foam is cured, the plug P is removed.

The method of forming the armrest assembly 110 of the second embodiment similar to that of the first embodiment except that the two piece top panel 130 comprising the receptacle 146 and the remaining portion of the top panel 130 is formed prior to sewing the top panel 130 to the remaining panels of the armrest cover 128.

The method of forming the armrest assembly 210 of the third embodiment is similar to the first two embodiments except that an oblong hole or opening 260 is first cut out of the top panel 230 for accommodating the receptacle 246. The receptacle 246 is then secured to the remaining portion of the top panel 230 by stitches S with the top panel 230 overlaying at least a portion of the flange 248 as shown best in FIG. 9. Once the receptacle 246 is secured to the remaining portion of the top panel 230, the top panel 230 is then secured to the remaining panels in the manner previously described.

Although sewing is a preferred technique for securing the receptacle 46, 146, 246 and panels together, other methods such as adhesive bonding may also be used.

The invention has been described in an illustrative manner, and it is to be understood that the terminology which has been used is intended to be in the nature of words of description rather than of limitation.

Obviously, many modifications and variations of the present invention are possible in light of the above teachings and it is, therefore, to be understood that within the scope of the appended claims wherein reference numerals are merely for convenience and are not to be in any way limiting. The invention may be practiced otherwise than it is specifically described.

What is claimed is:

1. An armrest assembly for use in an automotive vehicle comprising:

a cellular foam cushion pad (12, 112, 212) presenting an upper armresting surface (24, 124, 224), a pliable cover extending over said upper surface (24, 124, 224), receptacle means (46, 146, 246) disposed in said upper armresting surface (24, 124, 224) of said cushion pad (12, 112, 212) for receiving and supporting a beverage container (C), characterized by said receptacle means (46, 146, 246) being fabricated of a pliable material forming a part of said cover so that said receptacle means (46, 146, 246) is soft and supple to the touch and readily yielding and distorted with said cover under the weight of a user's arm so as not to detract from the comfort of the armrest assembly but yet is resilient for regaining its receptacle shape upon removing the weight of the arm.

2. An assembly as set froth in claim 1 further characterized by said cushion pad (12, 112, 212) including pivot means (14, 114, 214) for pivotally securing said cushion pad (12, 112, 212) to an automotive seat (16, 116, 216).

3. An assembly as set forth in claim 2 further characterized by said receptacle means (46, 146, 246) being molded from vacuum formable vinyl.

4. An assembly as set forth in claim 1 further characterized by said receptacle means (46, 146, 246) being fixedly secured to said armrest cover (28, 128, 228).

5. An assembly as set forth in claim 1 further characterized by said receptacle means (46, 146, 246) comprising a one piece member having a flange (48, 148, 248) forming at least a portion of said upper armresting surface (24, 124, 224) and an integral recess (50, 150, 250) extending beyond said upper armresting surface (24, 124, 224) into said armrest pad (26, 126, 226) for supporting the beverage container (C).

6. An assembly as set forth in claim 5 further characterized by said recess (50, 150, 250) comprising two cylindrical-shaped wells (52, 152, 252) each having a supportive side wall (54, 154, 254) and a supportive bottom wall (56, 156, 256) integrally connected to said flange (48, 148, 248) of said receptacle means (46, 146, 246).

7. An assembly as set forth in claim 6 further characterized by said recess (50, 150, 250) including a connecting portion (58, 158, 258) interconnecting respective said side walls (54, 154, 254) and bottom walls (56, 156, 256) of said wells (52, 152, 252), said connecting portion (58, 158, 258) dimensioned to accommodate a handle (H) of a beverage container (C) received in either of said wells (52, 152, 252).

* * * * *